(12) United States Patent
Pfeil

(10) Patent No.: US 8,440,278 B2
(45) Date of Patent: May 14, 2013

(54) INHIBITOR, RESIN MIXTURE CONTAINING SAME AND USE OF SAME

(75) Inventor: Armin Pfeil, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 13/491,768

(22) Filed: Jun. 8, 2012

(65) Prior Publication Data

US 2012/0315417 A1    Dec. 13, 2012

(30) Foreign Application Priority Data

Jun. 9, 2011 (DE) .......... 10 2011 077 248

(51) Int. Cl.
| | |
|---|---|
| *B29D 22/00* | (2006.01) |
| *B29D 23/00* | (2006.01) |
| *B32B 1/08* | (2006.01) |
| *B32B 27/32* | (2006.01) |

(52) U.S. Cl.
USPC ......... 428/35.2; 428/34.1; 524/5; 252/182.18

(58) Field of Classification Search ................ 428/35.2, 428/34.1; 524/5; 252/182.18
See application file for complete search history.

(56) References Cited

U.S. PATENT DOCUMENTS

| | | | |
|---|---|---|---|
| 3,297,745 | A | 1/1967 | Fekete et al. |
| 3,629,187 | A | 12/1971 | Waller |
| 3,772,404 | A | 11/1973 | Knight et al. |
| 3,825,518 | A | 7/1974 | Foster et al. |
| 4,383,826 | A | 5/1983 | Butler et al. |
| 4,618,658 | A | 10/1986 | Hefner, Jr. et al. |
| 5,854,305 | A | 12/1998 | Schwiegk et al. |
| 2002/0091214 | A1 | 7/2002 | Waanders et al. |
| 2003/0008967 | A1 | 1/2003 | Hecht et al. |
| 2008/0171807 | A1 | 7/2008 | Kumru et al. |
| 2011/0071234 | A1 | 3/2011 | Gross et al. |
| 2011/0136942 | A1 | 6/2011 | Pfeil |
| 2011/0201726 | A1 | 8/2011 | Pfeil |

FOREIGN PATENT DOCUMENTS

| | | |
|---|---|---|
| AU | B-45959/93 | 9/1994 |
| DE | 2 312 559 A | 9/1973 |
| DE | 37 44 390 A1 | 7/1989 |
| DE | 41 11 828 A1 | 10/1992 |
| DE | 41 31 457 A1 | 3/1993 |
| DE | 42 31 161 A1 | 3/1994 |
| DE | 195 31 649 A1 | 3/1997 |
| DE | 199 02 685 A1 | 8/2000 |
| DE | 199 61 342 A1 | 7/2001 |
| EP | 0 044 352 A1 | 1/1982 |
| EP | 0 684 906 A1 | 12/1995 |
| EP | 1 221 449 A1 | 7/2002 |
| EP | 1 935 860 A2 | 6/2008 |
| GB | 2 217 722 A | 11/1989 |
| WO | WO 02/5187 A1 | 1/2002 |
| WO | WO 02/051879 A1 | 7/2002 |
| WO | WO 2010/108939 A1 | 9/2010 |

OTHER PUBLICATIONS

Mona Malik et al., Current Status of Unsaturated Polyester Resins, J.M.S.—Rev. Macromol. Chem. Phys., C40(2&3), pp. 139-165 (2000).
Thomas Buergel, copending U.S. Appl. No. 13/457,261, filed Apr. 26, 2012; Accelerator Mixture for Peroxide Hardener and Two-Component Mortar System Containing Same.
Armin Pfeil et al., copending U.S. Appl. No. 13/492,149, filed Jun. 8, 2012; Inhibitor Combination, Resin Mixture Containing Same and Use of Same.

*Primary Examiner* — Michael C Miggins
(74) *Attorney, Agent, or Firm* — Crowell & Moring LLP

(57) ABSTRACT

The use of 3-pyridinol and 5-pyrimidinol derivatives for adjusting the reactivity and the gel time of resin mixtures and/or reactive resin mortars based on radically polymerizable compounds is described. Furthermore, a resin mixture and a reactive resin mortar containing the 3-pyridinol and 5-pyrimidinol derivatives for adjusting the reaction time and the gel time, and having improved storage stability and good low temperature hardening properties, are described.

19 Claims, No Drawings

INHIBITOR, RESIN MIXTURE CONTAINING SAME AND USE OF SAME

This application claims the priority of German Patent Document No. 10 2011 077 248.0, filed Jun. 9, 2011, the disclosure of which is expressly incorporated by reference herein.

BACKGROUND AND SUMMARY OF THE INVENTION

The subject matter of the present invention is the use of an inhibitor combination, in particular a 3-pyridinol or 5-pyrimidinol derivative, to adjust the reactivity and the gel time of mortar compositions based on synthetic resin, in particular based on radically polymerizable compounds, a resin mixture containing this inhibitor and a two-component mortar system with a reactive resin mortar (component A) which contains the resin mixture, and a hardener (component B), which contains a curing agent for the radically polymerizable compound. Furthermore, the present invention relates to the use of the resin mixture as an organic binder for use in the construction field.

The use of resin mixtures based on radically polymerizable compounds has long been known in a wide variety of fields, including the construction field. In the field of fastening technology, the use of resin mixtures as organic binders for polymer concrete has proven successful. This involves in particular their use as reactive resin mortar in two-component systems for dowel applications, in which the reactive resin mortar (component A) containing the resin mixture is based on radically polymerizable compounds and the hardener (component B) containing the curing agent. Other conventional ingredients such as inorganic additives or dyes may be present in one component and/or the other. The reaction is then initiated through the formation of free radicals when the two components are mixed, and the organic binder is hardened to a Duromer.

Resin mixtures containing a compound (a so-called accelerator), capable of accelerating the polymerization reaction and serving to accelerate the formation of the radical initiator, require the addition of stabilizers, i.e., compounds capable of inhibiting the polymerization reaction. These stabilizers serve to prevent the polymerization reaction and therefore prevent unwanted premature polymerization of the radically polymerizable compound during storage by capturing the free radicals thereby formed. Different compounds containing the radically hardenable compounds in amounts of 20 ppm to 1000 ppm as additives are generally used as stabilizers. Some of these stabilizers can also be used to adjust the gel time, i.e., for a targeted delay in initiation of the polymerization after mixing the resin mixture containing the accelerator or the reactive resin mortar containing the same with the hardener. However, the quantities of stabilizers must be significantly increased here to 5000 ppm or even more, depending on the desired gel time, and in particular when accelerators are used. In this context, the compounds are referred to as inhibitors to differentiate them functionally from stabilizers. Inhibitors of this type that are used are usually phenolic compounds such as hydroquinone, p-methoxyphenol, 4-tert-butylpyrocatechol, 2,6-di-tert-butyl-4-methylphenol or 2,4-dimethyl-6-tert-butylphenol, or stable nitroxyl radicals such as 4-hydroxy-2,2,6,6-tetramethylpiperidine-1-oxyl (Tempol).

The phenolic compounds, however, (in particular those that are especially suitable because of their reactivity to function as inhibitors for the premature polymerization of the aforementioned reactive resins, e.g., hydroquinone, pyrocatechol and their alkyl-substituted derivatives, e.g., 4-tert-butylpyrocatechol, methylhydroquinone and the like) have the disadvantage that they are deactivated by atmospheric oxygen, which leads to an insidious loss of inhibiting effect during storage. This deactivation is greater in the presence of alkaline media, e.g., alkalizing fillers such as cement, which can be problematic with mortar compounds having inorganic fillers or organic-inorganic hybrid mortars. Deactivation of the inhibitor results in the gel time dropping to unacceptably short times, so the resins and/or mortar compositions exhibit a great gel time drift during storage before use.

To prevent such a gel time drift, German Patent Application DE 195 31 649 A1 proposes replacing the stabilizer 4-tert-butylpyrocatechol, which is actually excellently suited for this, with stable nitroxyl radicals such as piperidinyl-N-oxyl or tetrahydropyrrole-N-oxyl, which are somewhat stable with regard to gel time. However, it has been found that these inhibitors lead to a disproportionately strong inhibition of the polymerization reaction at low temperatures, and reactive resins containing these inhibitors are subject to strong surface inhibition due to atmospheric oxygen, which results in an inadequate robustness of the curing. Furthermore, it is presumed that traces of acid, which may be present in the precursors of the radically curable, ethylenically unsaturated compounds, such as polymeric methylenediphenyl diisocyanate in urethane (meth)acrylate resins, for example, lead to disproportionation of the nitroxyl radicals and thus to their inactivation.

Sterically hindered phenols such as 2,6-di-tert-butyl-4-methylphenol and 2,4-dimethyl-6-tert-butylphenol have much more stable behavior with regard to gel time drift, and also lead to suitable inhibition of polymerization at room temperature. However, the quality of the cured resin and thus the extraction strength of a dowel set with the help of such an inhibited reactive resin are unsatisfactory at low temperatures. In addition, most of the compounds used for stabilizing the resins are not at all suitable as agents for adjusting the gel time, i.e., as inhibitors, because when present in larger quantities, such as those required to adjust the gel time, they act as retarders and have a deleterious effect on the polymerization and thus on the final mechanical properties of the polymer in a sensitive manner. They therefore act essentially to stabilize the resin for storage.

To solve the problem of inadequate hardening rate and thorough hardening at low temperatures, European Patent Application EP 1 935 860 A1 proposes that the highly activating tert-butyl radical of 4-tert-butylpyrocatechol be replaced by radicals which are not such strong activators, so that a sufficient inhibitor quality can be achieved with a significantly lower gel time drift, along with a high performance level and a great robustness of the two-component reactive resins, even at low curing temperatures.

The pyrocatechol and its derivatives are very efficient inhibitors for adjusting the gel time even at low temperatures, but they have a great tendency to autoxidation, which is exacerbated in an alkaline medium and therefore there is in turn a great tendency to gel time drift.

None of these previously known approaches lead to a satisfactory gel time stability of the reactive resin, especially in the presence of cement or other alkaline or acidic substances as fillers, or in the case of elevated residual acid numbers of the reactive resin mortar, with satisfactory low-temperature hardening at the same time.

The object on which the present invention is based is thus to provide inhibitors for free radical polymerization of the reactive resin mortars based on synthetic resins, as defined in the introduction, in particular radically curable compounds, that are filled with cement or other alkaline or acidic fillers, among others, and/or contain compounds that have a high residual acid value, are acid stable, ensure gel time stability during storage and can ensure the reactivity, robustness and curing quality of a mortar compound even at low temperatures, such as that achieved with the inhibitors known from the DE 195 31 649 A1 and EP 1 935 860 A1.

It has been found that, when the inhibitors used in the past are replaced by pyrimidinol or pyridinol compounds substituted in para position to the hydroxyl group, a satisfactory inhibitor quality can be achieved with significantly less gel time drift, and that a high performance level and a high robustness of the corresponding mortar compounds can surprisingly be achieved even at low curing temperatures.

The subject matter of the present invention is therefore the use of an inhibitor. Additional subject matter of the invention includes a resin mixture containing the inhibitor mixture, a reactive resin mortar containing the resin mixture, a two-component mortar system and use of same for chemical fastening.

The following definitions are used in the sense of the present invention:

"Resin mixture" denotes a mixture of the reactive mixture of resin production, containing the radically polymerizable compound, optionally a catalyst for producing the compound and the reactive diluents, accelerators and stabilizers plus optionally additional reactive diluents; this term is used as synonymous with the term "organic binder."

"Reactive resin mortar" denotes a mixture of a resin mixture and inorganic additives; the term "component A" is used synonymously with this.

"Curing agent" denotes substances which induce the polymerization (hardening) of the basic resin.

"Hardener" denotes a mixture of curing agent and inorganic additives.

"Accelerator" denotes a compound capable of accelerating the polymerization reaction (curing), which serves to accelerate the formation of the radical initiator.

"Stabilizer" denotes a compound which is capable of inhibiting the polymerization reaction (curing) and serves to prevent the polymerization reaction and thus an unwanted premature polymerization of the radically polymerizable compound during storage; these compounds are usually used in such small amounts that the gel time is not affected.

"Inhibitor" also denotes a compound capable of inhibiting the polymerization reaction (hardening), which results in a delay in the polymerization reaction immediately after adding the curing agent; these compounds are usually used in amounts such that the gel time is affected.

"Reactive diluent" denotes liquid or low-viscosity, radically polymerizable compounds, which dilute the resin mixture and thereby impart the viscosity required for application thereof, contain functional groups capable of reacting with the basic resin and part of the cured compound (mortar) predominantly in polymerization (hardening).

"Mortar compound" denotes the formulation obtained by mixing the reactive resin mortar with the hardener, which contains the curing agent, and can be used directly as such for chemical fastening.

"Two-component mortar system" refers to a system comprising a component A, the reactive resin mortar, and a component B, the hardener, such that the two components are stored separately to inhibit the reaction, so that hardening of the reactive resin mortar occurs only after the components have been combined.

The subject matter of the invention is the use of a compound of general formula (I) or (II):

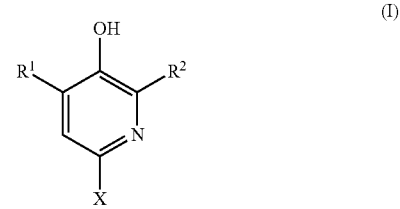

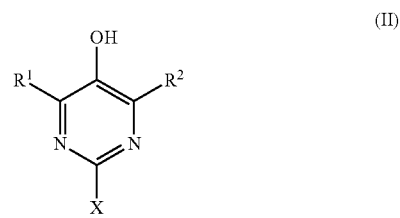

in which $R^1$ and $R^2$, independently of one another, denote hydrogen or a branched or unbranched $C_1$-$C_{20}$ alkyl group, and X is any electron-shifting group, for adjusting the reactivity and the gel time of resin mixtures and/or reactive resin mortars based on radically polymerizable compounds. The adjustment of the reactivity and the gel time of resin mixtures and/or reactive resin mortars based on radically polymerizable compounds is accomplished by adding the compound of general formula (I) or (II) to the resin mixture.

The electron-shifting group X may be any group that can shift electron density into the aromatic ring, either directly or by conjugation or hyperconjugation, and can thus activate the OH group for the hydrogen transfer to free radicals, preferably to alkyl radicals, such as those which occur in radical polymerization, and at the same time contributes to the solubility of the 5-pyrimidinol anchor 3-pyridinol compounds, because these do not dissolve adequately in methacrylate resins having a medium to low polarity, due to their own high polarity, with alkoxy, amino, N-alkylamino or N,N-dialkylamino groups being preferred. In particular, X denotes —$OR^3$, —$NH_2$, —$NHR^3$ or —$NR^3{}_2$, where $R^3$ is a branched or unbranched $C_1$-$C_{20}$ alkyl group or a $C_2$-$C_4$ polyalkylene oxide chain, such as polyethylene oxide or polypropylene oxide, preferably a branched or unbranched $C_1$-$C_8$ alkyl group, more preferably methyl or n-octyl.

The $R^1$ and $R^2$ radicals in formulas (I) and (II), independently of one another, are hydrogen, a branched or unbranched $C_1$-$C_8$ alkyl group, preferably methyl, isopropyl or tert-butyl.

The compound of formulas (I) and (II) is preferably a compound of formulas 1, 2 or 3:

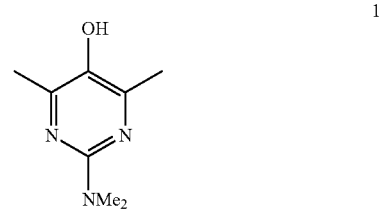

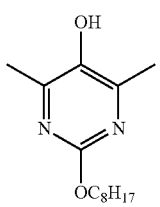

2

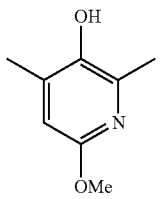

3

Further subject matter of the invention is a resin mixture comprising at least one radically polymerizable compound, optionally at least one reactive diluent and an agent for adjusting the reactivity and the gel time, wherein the agent for adjusting the reactivity and the gel time is a compound of the general formula (I) or (II)

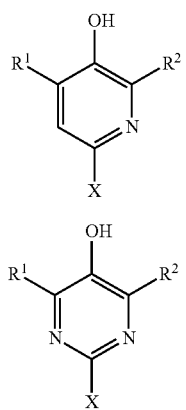

as described above. Reference is made to the preceding discussion with respect to the compound of formulas (I) and (II).

The agent for adjusting the reactivity and the gel time is preferably used in an amount of 100 ppm to 2.0 wt %, preferably from 500 ppm to 1.5 wt % and more preferably from 1000 ppm to 1 wt %, based on the radically polymerizable compound.

Ethylenically unsaturated compounds, cyclic monomers, compounds with carbon-carbon triple bonds and thiol-yne/ene resins are suitable as the radically polymerizable compounds according to the invention, such as those with which those skilled in the art are familiar.

Of these compounds, the group of ethylenically unsaturated compounds is preferred, comprising styrene and derivatives thereof, (meth)acrylates, vinyl esters, unsaturated polyesters, vinyl ethers, allyl ethers, itaconates, dicyclopentadiene compounds and unsaturated fats, of which unsaturated polyesters resins and vinyl ester resins in particular are suitable, such as those described in EP 1 935 860 A1, DE 195 31 649 A1 and WO 10/108,939 A1. Vinyl ester resins are most preferred because of their hydrolytic stability and excellent mechanical properties.

Examples of suitable unsaturated polyesters which may be used in the resin mixture according to the invention are divided into the following categories, as classified by M. Malik et al. in J. M. S.—Rev. Macromol. Chem. Phys. C40 (2 and 3), pp. 139-165 (2000):

(1) Ortho resins: These are based on phthalic anhydride, maleic anhydride or fumaric acid and glycols such as 1,2-propylene glycol, ethylene glycol, diethylene glycol, triethylene glycol, 1,3-propylene glycol, dipropylene glycol, tripropylene glycol, neopentyl glycol or hydrogenated bisphenol A.

(2) Iso resins: These are synthesized from isophthalic acid, maleic anhydride or fumaric acid and glycols. These resins may contain larger amounts of reactive diluents than the ortho resins;

(3) Bisphenol A fumarates: These are based on ethoxylated bisphenol A and fumaric acid;

(4) HET acid resins (hexachloroendomethylene tetrahydrophthalic acid resins): These are resins obtained from anhydrides or phenols containing chlorine/bromine in the synthesis of unsaturated polyester resins.

In addition to these resin classes, the so-called dicyclopentadiene resins (DCPD resins) may also be differentiated as unsaturated polyester resins. The class of DCPD resins is obtained either by modification of one of the types of resins mentioned above by Diels-Alder reaction with cyclopentadiene, or alternatively, they are obtained by a first reaction of a diacid, e.g., maleic acid, with dicyclopentadienyl, and then by a second reaction, usually the synthesis of an unsaturated polyester resin, wherein the latter is referred to as a DCPD maleate resin.

The unsaturated polyester resin preferably has a molecular weight Mn in the range of 500 to 10,000 daltons, more preferably in the range of 500 to 5000 daltons and even more preferably in the range of 750 to 4000 daltons (according to ISO 13885-1). The unsaturated polyester resin has an acid value in the range of 0 to 80 mg KOH/g, preferably in the range of 5 to 70 mg KOH/g resin (according to ISO 2114-2000). If a DCPD resin is used as the unsaturated polyester resin, the acid value is preferably 0 to 50 mg KOH/g resin.

Vinyl ester resins of the invention are preferably oligomers or polymers with at least one (meth)acrylate terminal group, so-called methacrylate-functionalized resins, which also include urethane methacrylate resins and epoxy methacrylates.

Vinyl ester resins having unsaturated groups only in the terminal position are obtained, for example, by reacting epoxy oligomers or polymers (e.g., bisphenol A-diglycidyl ether, epoxies of the phenol-novolak type or the epoxy oligomers based on tetrabromobisphenol A) with methacrylic acid or methacrylamide, for example. Preferred vinyl ester resins include methacrylate-functionalized resins and resins obtained by reacting an epoxy oligomer or polymer with methacrylic acid or methacrylamide, preferably with methacrylic acid. Examples of such compounds are known, for example, from U.S. Pat. No. 3,297,745 A, U.S. Pat. No. 3,772,404 A, U.S. Pat. No. 4,618,658 A, GB 2217722 A1, DE 3744390 A1 and DE 4131457 A1.

In this context, reference is made to the reference is made to US Patent Publication No. 2011/0071234, the contents of which are hereby incorporated by reference in their entirety.

The vinyl ester resin preferably has a molecular weight Mn in the range of 500 to 3000 daltons, and more preferably 500 to 1500 daltons (according to ISO 13885-1). The vinyl ester resin has an acid value in the range of 0 to 50 mg KOH/g resin, preferably in the range of 0 to 30 mg KOH/g resin (according to ISO 2114-2000).

Ethoxylated bisphenol A-dimethacrylate with a degree of ethoxylation of 2 to 10, preferably 2 to 4, difunctional, trifunctional or higher functional urethane methacrylate oligomers or mixtures of these hardenable constituents are especially suitable as the vinyl ester resin.

More suitable are the known reaction products of di- or polyisocyanates and hydroxyalkyl methacrylates, such as those described in DE 2 312 559 A1, adducts of (di)isocyanates and 2,2-propanebis-[3-(4-phenoxy)-1,2-hydroxypropane-1-methacrylate], according to U.S. Pat. No. 3,629,187, and the adducts of isocyanates and methacryloylalkyl ethers, alkoxybenzenes and/or alkoxycycloalkanes, such as those described in EP 44352 A1. In this context, reference is made to DE 2312559 A1, DE 19902685 A1, EP 0684906 A1, DE 4111828 A1 and DE 19961342 A1. Mixtures of suitable monomers may of course also be used.

All of the resins that may be used according to the invention can be modified according to methods with which those skilled in the art are familiar to achieve lower acid numbers, hydroxy numbers or anhydride numbers, for example, or they may be made more flexible by introducing flexible units into the basic structure and the like.

In addition, the resin may also contain other reactive groups that can be polymerized with a radical initiator such as peroxides, and reactive groups derived from itaconic acid, citraconic acid and allylic groups and the like, such as those described in WO 2010/108939 A1 (itaconic acid ester).

The resin mixture contains 10 to 90 wt %, preferably 30 to 70 wt %, based on the resin mixture, of at least one radically polymerizable compound.

The resin mixture may contain solvents, if necessary. The solvents may be inert with respect to the reaction system or they may participate in the polymerization during hardening, so-called reactive diluents.

In a preferred embodiment of the invention, the resin mixture contains additional low-viscosity, radically polymerizable compounds as reactive diluents to adjust the viscosity of the radically polymerizable compound which functions as a resin, if necessary. The reactive diluents may be added in an amount of 90 to 10 wt % preferably 70 to 30 wt %, based on the resin mixture.

Suitable reactive diluents are described in patent applications EP 1 935 860 A1 and DE 195 31 649 A1. The resin mixture preferably contains as the reactive diluent a (meth) acrylic acid ester, where (meth)acrylic acid esters are especially preferably selected from the group consisting of hydroxypropyl (meth)acrylate, 1,2-butanediol di(meth)acrylate, trimethylolpropane tri(meth)acrylate, 2-ethylhexyl (meth)acrylate, phenylethyl (meth)acrylate, tetrahydrofurfuryl (meth)acrylate, ethyl triglycol (meth)acrylate, N,N-dimethylaminoethyl (meth)acrylate, N,N-dimethylaminomethyl (meth)acrylate, 1,4-butanediol di(meth)acrylate, acetoacetoxyethyl (meth)acrylate, 1,2-ethanediol di(meth)acrylate, isobornyl (meth)acrylate, diethylene glycol di(meth)acrylate, methoxypolyethylene glycol mono(meth)acrylate, trimethylcyclohexyl (meth)acrylate, 2-hydroxyethyl (meth)acrylate, dicyclopentenyloxyethyl (meth)acrylate, and/or tricyclopentadienyl di(meth)acrylate, bisphenol A (meth)acrylate, novolak epoxy di(meth)acrylate, di[(meth)acryloylmaleoyl] tricycle-5.2.1.0$^{2.6}$-decane, dicyclopentenyloxyethyl crotonate, 3-(meth)acryloyloxymethyltricyclo-5.2.1.0$^{2.6}$-decane, 3-(meth)cyclo-pentadienyl (meth)acrylate, isobornyl (meth) acrylate and decalyl-2-(meth)acrylate.

Essentially other conventional radically polymerizable compounds may also be used alone or in mixture with the (meth)acrylic acid esters, e.g., styrene, α-methylstyrene, alkylated styrenes such as tert-butylstyrene, divinylbenzene and allyl compounds.

The nomenclature "(meth)acryl . . . / . . . (mety)acryl . . . " used to denote the radically polymerizable compounds means that this terminology refers to both "methacryl . . . / . . . methacryl . . . " compounds and "acryl . . . / . . . acryl . . . " compounds.

According to a preferred embodiment of the invention, the resin mixture is present in a pre-accelerated form; in other words, it contains an accelerator for the curing agent. Preferred accelerators for curing agents include aromatic amines and/or salts of copper, cobalt, manganese, tin, vanadium or cerium. Especially advantageous accelerators may be N,N-dimethylaniline, N,N-diethylaniline, N,N-diisopropanol-p-toluidine, N,N-diisopropylidene-p-toluidine, N,N-dimethyl-p-toluidine, N,N-diethylol-p-toluidine, N,N-diisopropylol-m-toluidine, N,N-bis(2-hydroxyethyl)toluidine, N,N-bis(2-hydroxyethyl)xylidine, N-methyl-N-hydroxyethyl-p-toluidine, cobalt octoate, cobalt naphthenate, vanadium(IV) acetylacetonate and vanadium(V) acetylacetonate.

The accelerator is present according to the invention in an amount of 100 ppm to 5 wt %, preferably 1000 ppm to 2.5 wt %, based on the resin mixture.

Further subject matter of the invention is a reactive resin mortar which contains inorganic additives such as fillers and/or other conventional additives in addition to the resin mixture described above, the organic binder.

The amount of the resin mixture in the reactive resin mortar is preferably 10 to 60 wt %, more preferably 20 to 30 wt %, based on the reactive resin mortar.

The fillers used are conventional fillers, preferably mineral or mineral-like fillers, such as quartz, glass, sand, quartz sand, quartz meal, porcelain, corundum, ceramics, talc, silica (e.g., pyrogenic silica), silicates, clay, titanium dioxide, chalk, barite, feldspar, basalt, aluminum hydroxide, granite or sandstone, polymeric fillers such as thermosetting plastics, hydraulically curable fillers such as gypsum, quicklime or cement (e.g., alumina cement or Portland cement), metals such as aluminum, carbon black, also wood, mineral or organic fibers or the like or mixtures of two or more thereof which may be added in the form of a powder, granules or molded bodies. The fillers may be present in any forms, for example, as a powder or meal or as molded bodies, e.g., in the form of cylinders, rings, spheres, flakes, rods, saddle shapes or crystal shapes or also in fiber form (fibrillary fillers) and the corresponding basic particles preferably have a maximum diameter of 10 mm. Fillers are preferably present in the respective components in an amount of up to 90 wt %, in particular 3 to 85 wt %, especially 5 to 70 wt %. However, the globular inert substances (spherical shapes) are preferred and have a definite reinforcing effect.

Other conceivable additives also include thixotropic agents, such as optionally organically after-treated pyrogenic silica, bentonites, alkyl and methyl celluloses, castor oil derivatives or the like, plasticizers such as phthalic acid esters or sebacic acid esters, stabilizers, antistatic agents, thickeners, flexibilizers, hardening catalysts, rheology aids, wetting agents, coloring additives such as dyes or pigments (for example, for differential dyeing of the components for better monitoring of the thorough mixing thereof or the like) or mixtures of two or more thereof are possible. Nonreactive diluents (solvents) may also be present, preferably in an amount of up to 30 wt %, based on the respective component (reactive resin mortar, hardener), for example, from 1 to 20 wt %, such as low alkyl ketones, e.g., acetone, di-low alkyl-low alkanolamides, such as dimethylacetamide, low alkylbenzenes, such as xylenes or toluene, phthalic acid esters or paraffins or water.

Another subject matter of the invention is a two-component mortar system comprising as component A the reactive resin mortar just described and as component B a hardener that is stored in a separate location spatially from the reactive resin mortar, which thus inhibits the reaction. The hardener preferably contains a peroxide as the curing agent. All peroxides with which those skilled in the art are familiar and which are used for hardening unsaturated polyester resins and vinyl ester resins may be used. Such peroxides comprise organic and inorganic peroxides, either liquid or solid, wherein hydrogen peroxide may also be used. Examples of suitable peroxides include peroxycarbonates of the formula —OC(O)O—, peroxy esters of the formula —C(O)OO—, diacyl peroxides of the formula —C(O)OOC(O)—, dialkyl peroxides of the formula —OO— and the like. These may be present as oligomers or polymers. A series of examples of suitable peroxides is described in the patent applications US 2002/0091214 A1, paragraph [0018], WO 02051879 A1 and EP 1 221 449 A1.

The peroxides are preferably selected from the group of organic peroxides. Suitable organic peroxides include tertiary alkyl hydroperoxides such as tert-butyl hydroperoxide and other hydroperoxides such as cumene hydroperoxide, peroxy esters or peracids such as tert-butyl peresters, benzoyl peroxide, peracetates and perbenzoates, lauryl peroxide, including (di)peroxy ester, perethers such as peroxydiethyl ether, perketones such as methyl ethyl ketone peroxide. The organic peroxides used as hardeners are often tertiary peresters or tertiary hydroperoxides, i.e., peroxide compounds with tertiary carbon atoms bound directly to an —O—O-acyl group or an —OOH group. However, mixtures of these peroxides with other peroxides may also be used according to the invention. The peroxides may also be mixed peroxides, i.e., peroxides having two different peroxide-carrying units in one molecule. Benzoyl peroxide (BPO) is preferably used for hardening.

The curing agents are expediently inertized by water, non-reactive diluents having a liquefying effect, for example, phthalates (WO 0205187 A1) or inert fillers, quartz sands and aluminas being preferred.

The peroxides are used according to the invention in amounts of 0.1 to 10 wt %, preferably from 1 to 6 wt %, based on the resin mixture.

The hardener of the two-component mortar system preferably also contains inorganic additives, these additives being the same as those that may be added to the reactive resin mortar.

In an preferred embodiment of the two-component mortar system, component A additionally contains a hydraulically setting or polycondensable inorganic compound in addition to the reactive resin mortar, and component B also contains water in addition to the curing agent. Such mortar compositions are described in detail in DE 42 31 161 A1. Component A preferably contains cement, such as Portland cement or aluminate cement, as the hydraulically setting or polycondensable inorganic compound, wherein cements having little or no iron oxide content are especially preferred. Gypsum may also be used as such or in mixture with the cement as the hydraulically setting inorganic compound. Silicatic polycondensable compounds, in particular soluble, dissolved and/or amorphous silicon dioxide-containing substances may also be used as the polycondensable inorganic compound.

The two-component mortar system preferably comprises component A and component B, which are accommodated separately in different containers to inhibit the reaction, for example, in a multichamber device such as a multichamber cartridge and/or shell, from which containers the two components are dispensed and mixed by the action of mechanical pressing forces or under the influence of a gas pressure. Another possibility is that the two-component mortar system may be fabricated as two-component capsules, which are introduced into the borehole and are destroyed by impact rotational setting of the fastening element with simultaneous thorough mixing of the two components of the mortar composition. A cartridge system or an injection system, in which the two components are expressed from the separate containers and are passed through a static mixer, in which they are mixed homogeneously and then discharged through a nozzle, preferably directly into the borehole, is preferably used.

The resin mixture according to the invention, the reactive resin mortar and the two-component mortar system are used especially in the construction field, for example, for maintaining concrete, as polymer concrete, as a coating composition based on synthetic resin or as a cold-curing road marking. They are especially suitable for chemical fastening of anchoring elements such as anchors, rebar, screws and bolts and the like in boreholes, in particular in boreholes in different substrates, in particular mineral substrates such as those based on concrete, porous concrete, brickwork, lime sandstone, sandstone, natural rock and the like.

In contrast with resin mixtures and reactive resin mortars, which are inhibited with phenolic inhibitors, the systems according to the invention also have a stable gel time, even after prolonged storage, i.e., the gel time does not drift toward unacceptable short values, even in subsequent use. In comparison with resin mixtures and reactive resin mortars inhibited with stable nitroxyl radicals, the systems according to the invention have good and thorough hardening, even at low temperatures.

The following examples serve to further illustrate the invention.

EXAMPLES OF EMBODIMENTS

The gel times and the load values of the mortar compounds produced according to the examples and the comparative examples are compared and the stability of reactive resin mortars according to the invention in storage is investigated:

Example 1

Component A

To prepare the reactive resin mortar, first 1.786 g diisopropyl-p-toluidine is dissolved in 160 g methacrylate resin while heating. Then 0.349 g inhibitor, 2-(dimethylamino)-4,6-dimethylpyrimidin-5-ol (1) is added to this solution and stirred until obtaining a homogeneous solution. Next, 12.0 g pyrogenic silica (Aerosil® R202; Evonik Degussa GmbH), 80 g aluminate cement and 144.0 g quartz sand with an average particle size of 0.4 mm are dispersed in the resin solution in a dissolver in vacuo until obtaining a homogeneous paste.

Component B

As the hardener for the methacrylate resin, 10 wt % of a 40% dispersion of benzoyl peroxide in water and 14 wt % demineralized water are added first and then 53 wt % of a quartz sand with an average particle size of 40 µm and 22 wt % of an alumina with an average particle size of 0.8 μm are dispersed therein and thickened with 1 wt % pyrogenic silica.

Example 2

A reactive resin mortar and a hardener are prepared according to example 1, except that 0.526 g 4,6-dimethyl-2-(octyloxy)pyrimidin-5-ol (2) is added as inhibitor to the reactive resin mortar.

Example 3

A reactive resin mortar and a hardener are prepared according to example 1, except that 0.216 g 6-(methoxy)-2,4-dimethylpyridin-3-ol (3) is added as an inhibitor to the reactive resin mortar.

Comparative Example 1

A reactive resin mortar and a hardener are prepared for comparison according to the above examples, except that 0.123 g 4-tert-butylcatechol is added as inhibitor to the reactive resin mortar.

Comparative Example 2

Furthermore, a reactive resin mortar and a hardener are prepared according to the preceding examples for comparison, except that 0.205 g 3,5-di-tert-butyl-4-hydroxytoluene (BHT) is added as inhibitor to the reactive resin mortar.

a) Determination of Gel Time

The gel time of the mortar compositions prepared according to the examples and comparative examples is determined using a commercial device (GELNORM® gel timer) at a temperature of 25° C. To do so, components A and B are mixed in a volume ratio of 3:1 and then, immediately after being mixed, the mixture is regulated thermally at 25° C. in a silicone bath, and the temperature of the sample is measured. The sample itself was in a test tube, which is placed in an air jacket lowered into the silicone bath for thermal regulation.

The heat evolved by the sample is plotted as a function of time. The analysis is performed according to DIN16945, Sheet 1 and DIN 16916. The gel time is the time at which a 10K rise in temperature is reached, namely from 25° C. to 35° C. here.

TABLE 1

Results of determination of gel time

| Inhibitor | Amount of inhibitor (wt %)$^a$ | Gel time (25° C. → 35° C.) (min) |
|---|---|---|
| 1 | 0.218 | 5.0 |
| 2 | 0.329 | 6.0 |
| 3 | 0.135 | 4.7 |
| 4-tert-butylcatechol | 0.077 | 6.2 |
| BHT | 0.128 | 5.9 |

$^a$Based on component A

It is clear from this that the gel time of the inventive mortar compositions, adjusted using inhibitors 1, 2 and 3 at room temperature, is in the range of that of the mortar compositions adjusted using the inhibitors known from the prior art.

b) Determination of the Load Values

To determine the load values of the cured mortar composition, an M12 anchor threaded rod is used; it is doweled into a borehole in concrete with a diameter of 14 mm and a borehole depth of 72 mm using the inventive two-component reactive resin. The average failure load is determined by centrally extracting the anchor threaded rod with tight support using high-strength anchor threaded rods. Three anchor threaded rods are doweled in place in each case and their load values are determined after curing for 24 hours. The load values thereby determined are also listed as averages in Table 1 below.

TABLE 2

Results of the determination of load values

| Inhibitor | Reference[1] (N/mm$^2$) | F1b[2] (N/mm$^2$) | −5° C.[3] (N/mm$^2$) | −10° C.[3] (N/mm$^2$) | +40° C.[3] (N/mm$^2$) |
|---|---|---|---|---|---|
| 1 | 24.2 ± 1.8 | 25.0 ± 1.0 | 23.2 ± 1.0 | 21.9 ± 0.8 | 21.9 ± 0.2 |
| 2 | 22.0 ± 1.0 | 22.9 ± 0.8 | 21.1 ± 0.2 | 17.1 ± 0.2 | 21.5 ± 1.5 |
| 3 | 24.4 ± 1.0 | 25.9 ± 0.4 | 22.6 ± 1.7 | 19.4 ± 0.7 | 23.0 ± 0.1 |
| 4-tert-butylcatechol | 23.5 ± 0.9 | 24.3 ± 0.3 | 26.3 ± 0.6 | 24.8 ± 1.3 | 21.7 ± 0.6 |
| BHT | 25.6 ± 0.6 | 24.5 ± 0.2 | 22.0 ± 0.7 | 21.6 ± 0.8 | 23.8 ± 1.1 |

[1]Dry, cleaned borehole, setting and curing at room temperature
[2]Half-cleaned borehole in water-saturated concrete setting and curing room temperature
[3]Same as 1 but with setting and curing at −5° C., −10° C. and +40° C.

As shown in Table 2 above, the two-component resin compositions, adjusted according to the invention with the inhibitors 1, 2 and 3, have load values −10° C., −5° C. and +40° C. that are within the range of those obtained with the resin compositions adjusted using the individual inhibitors, even with half-cleaned and wet boreholes.

c) Measuring the Stability of the Reactive Resin Mortar in Storage at +40° C. Via the Gel Time The reactive resin mortar is stored in contact with air at +40° C., and a sample for determining the gel time is taken at intervals of time. The gel time was determined according to a) in each case. The results are summarized in Table 3.

TABLE 3

Results of testing the storage stability of the reactive resin mortar according to the invention by determination of the gel time

| | Gel time (+25° C. → +35° C.) (min) | | | |
|---|---|---|---|---|
| Inhibitor | freshly prepared | after 3 weeks | after 11 weeks | after 21 weeks |
| 1 | 4.1 | 3.4 | 3.1 | 2.6 |
| 2 | 6.0 | 5.9[4] | — | — |
| 3 | 4.7 | 4.3 | 3.8 | 4.5 |

[4]10 days at +40° C.

The gel time of component A, adjusted with inhibitors such as 4-tert-butylcatechol, would be much less than 50% of the original gel time after 21 weeks at +40° C.

These examples prove the surprising fact that the reactive resin mortars according to the invention have a greatly improved stability in storage and thus have a greatly reduced gel time drift, and at least have equivalent or sometimes even better performance values (load values) in comparison with the comparable reactive resin mortars.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of adjusting the reactivity and gel time of resin mixtures and/or active resin mortars based on radically polymerizable compounds comprising:

adding a compound of general formulas (I) or (II):

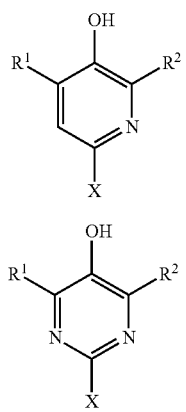

wherein $R^1$ and $R^2$, independently of one another, denote hydrogen or a branched or unbranched $C_1$-$C_{20}$ alkyl group, X is any electron-shifting group, to a resin mixture, wherein the compound adjusts the reactivity and the gel time of resin mixtures and/or the active resin mortars based on radically polymerizable compounds.

2. The method according to claim 1, wherein the electron-shifting group X in formula (I) is selected from the group consisting of —$OR^3$, —$NH_2$, —$NHR^3$ or —$NR^3{}_2$, in which $R^3$ independently is a branched or unbranched $C_1$-$C_{20}$ alkyl group or a $C_2$-$C_4$ polyalkylene oxide group.

3. The method according to claim 2, wherein $R^1$ and $R^2$ in formula (I), independently of one another, are hydrogen or a branched or unbranched $C_1$-$C_8$ alkyl group.

4. The method according to claim 3, wherein $R^1$ and $R^2$ in formula (I), independently of one another, are methyl, isopropyl or tert-butyl.

5. The method according to claim 4, wherein the compound of formula (I) is a compound of formulas 1, 2 or 3:

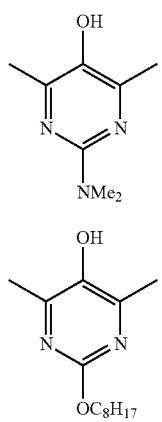

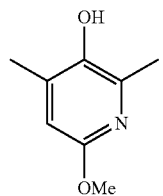

6. A resin mixture comprising at least one radically polymerizable compound and an agent for adjusting the reactivity and the gel time of the radically polymerizable compound, characterized in that the agent for adjusting the reactivity and the gel time is a compound of the general formulas (I) or (II):

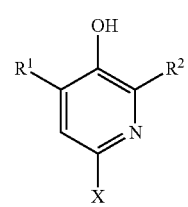

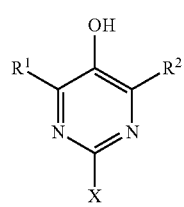

in which $R^1$ and $R^2$, independently of one another, are hydrogen, a branched or unbranched $C_1$-$C_{20}$ alkyl group and X is any electron-shifting group.

7. The resin mixture according to claim 6, wherein the resin mixture also contains an accelerator for the curing agent.

8. The resin mixture of claim 6, wherein the mixture further comprises a reactive diluent and an agent for adjusting the reactivity and the gel time.

9. The resin mixture according to claim 6, wherein the electron-shifting group X in formula (I) is selected from the group consisting of —$OR^3$, —$NH_2$, —$NHR^3$ and —$NR^3{}_2$, wherein $R^3$ independently is a branched or unbranched $C_1$-$C_{20}$ alkyl group or a $C_2$-$C_4$ polyalkylene oxide group.

10. The resin mixture according to claim 9, wherein $R^1$ and $R^2$ in formula (I), independently of one another, are hydrogen, a branched or unbranched $C_1$-$C_8$ alkyl group.

11. The resin mixture according to claim 10, wherein $R^1$ and $R^2$ in formula (I), independently of one another, are methyl, isopropyl or tert-butyl.

12. The resin mixture according to claim 11, wherein the agent for adjusting the reactivity and the gel time is a compound of formulas 1, 2 or 3:

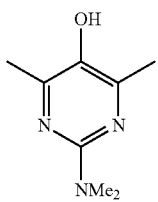

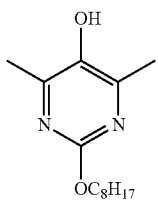

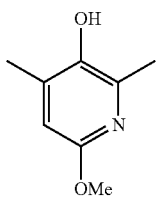

13. A reactive resin mortar comprising the resin mixture according to claim 6 and inorganic additives.

14. A two-component mortar system comprising as component A the reactive resin mortar according to claim 13 and as component B a hardener arranged separately to inhibit the reaction.

15. The two-component mortar system according to claim 14, wherein the hardener contains an organic or inorganic peroxide as the curing agent.

16. The two-component mortar system according to claim 14 wherein the hardener also contains inorganic additives.

17. The two-component mortar system according to claim 14, wherein component A additionally contains a hydraulically setting or polycondensable inorganic compound in addition to the reactive resin mortar, and component B additionally contains water in addition to the curing agent.

18. A method of chemical fastening, comprising applying the two-component mortar system of claim 14 for chemical fastening.

19. A shell, cartridge or film bag containing a two-component mortar system according to claim 14, comprising two or more separate chambers in which the reactive resin mortar and/or the hardener are arranged.

* * * * *